United States Patent
Furman et al.

(10) Patent No.: US 7,016,650 B2
(45) Date of Patent: Mar. 21, 2006

(54) MULTI-PATH ADAPTIVE RECEIVER APPARATUS AND METHOD FOR THE RECEPTION OF FREQUENCY SHIFT KEYED SIGNALS

(75) Inventors: William Nelson Furman, Fairport, NY (US); John Wesley Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 548 days.

(21) Appl. No.: 10/365,535

(22) Filed: Feb. 13, 2003

(65) Prior Publication Data

US 2004/0162049 A1  Aug. 19, 2004

(51) Int. Cl.
*H04B 1/10* (2006.01)

(52) U.S. Cl. .................. 455/65; 455/506; 455/303; 375/348

(58) Field of Classification Search .............. 455/65, 455/501, 506, 114.2, 296, 303; 375/343, 375/334, 346, 348, 349
See application file for complete search history.

(56) References Cited

U.S. PATENT DOCUMENTS

| | | | |
|---|---|---|---|
| 4,852,090 A | 7/1989 | Borth | |
| 6,088,406 A | 7/2000 | Suzuki | |
| 2003/0189894 A1 * | 10/2003 | Nee | ............ 370/208 |

* cited by examiner

*Primary Examiner*—Edward F. Urban
*Assistant Examiner*—Blane J. Jackson
(74) *Attorney, Agent, or Firm*—Duane Morris LLP

(57) ABSTRACT

A system and method for reducing multi-path distortion of an M-ary communication signal is implemented with M×N parallel processors, a multi-path estimator, a metric selector and a decision processor. Parallel processors process each combination of possible signal symbols M and hypothesized guard times N, the output of the processors are supplied to the multi-path estimator which estimates the actual multi-path distortion of the transmitted symbol. The metric selector selects the processors with a guard time $G_n$ most closely approximating the estimate from the multi-path estimator. The selected outputs are used in a decision processor to determine the transmitted symbols. The selected outputs are low passed filtered.

23 Claims, 5 Drawing Sheets

MULTI-PATH ADAPTIVE RECEIVER APPARATUS AND METHOD FOR THE RECEPTION OF FREQUENCY SHIFT KEYED SIGNALS

BACKGROUND

Wireless communication channels are often subject to degradation such as multi-path distortion or fading. As is known in the art, multi-path distortion is caused by a transmitted signal taking more than one propagation path from the transmitter to the receiver. Typically, the desired path between a transmitter and a receiver is the most direct path since signals traveling along this path have the lowest propagation time. Other possible propagation paths between the transmitter and the receiver are not as direct and therefore are longer than the direct path and accordingly have a greater propagation time.

In a typical communication system, a transmitter will emit a signal, the receiver will receive the direct path emitted signal and, at some time later, the receiver will also receive one or more of the non-direct path emitted signals, known in the art as multipath signals. The multipath signals are typically substantially the same as the direct path signal albeit for the time delay in reaching the receiver. Consequently, the receiver will receive multiple versions of the emitted signal. The received multipath signals may be delayed by an amount of time that causes the multipath signal of an emitted signal to interfere with the direct path signal of a subsequently-emitted signal, thereby causing intersymbol interference at the receiver.

Communication systems, which utilize Frequency Shift Keyed (FSK) signaling or other modulation schemes to convey information, often operate over communication channels that can experience these multiple delayed versions of the transmitted waveform at the receiver. While a real concern for fixed systems of transmitter and receivers, a reception signal received by a portable communication terminal such as an automobile telephone, a portable telephone, or the like, is more readily distorted because of multi-path distortion and is more difficult to compensate for in that the multi-path profile is constantly changing as the receiver moves through different geographic and atmospheric environments.

Frequency Shift Keying is an extremely mature modulation or signaling technique utilized to convey data over radio links. It is characterized as the transmission of sinusoidal waveforms of different frequencies, dependent of the data to be conveyed. the simplest form of FSK, binary FSK, sends one frequency sinusoidal when the data bit is a "0" and an alternate frequency sinusoid when the data is a "1". On a communication channel that is experiencing multi-path distortion, the original transmitted signal can arrive at the receiver along with delayed versions of the transmitted signal. Typical delays between the first reception and the delayed receptions on a high frequency (HF) communication channel are 2–4 ms. FSK data modems combat the effects of this distortion by transmitting the sinusoids for symbol or baud durations, which are long in comparison to the delay distortion. For example: a 75 baud FSK modem will send one of two sinusoidal signals, depending on the data, for a duration of 13.3333 ms (milliseconds)($\frac{1}{75}$), typical HF delay distortion of 2–4 ms will only corrupt the first 15–30% of the received waveform.

Current receiver implementations assume a certain amount of multi-path distortion and disregard the portion of the received waveform, identified as the guard time, that is prone to this distortion. This would be, for the above example, the initial 2–4 ms of each transmitted symbol, which may be corrupted by a delayed version of the previous symbol. The disadvantage of this approach is that an implementation may assume too little or too much multi-path guard time. If too much multi-path guard time is assumed valuable signal energy is discounted from the receive process with a resulting higher bit error rate. If too little multi-path distortion protection is assumed, the distortion of previous symbols can corrupt the demodulation of the current symbol resulting in a higher bit error rate. Thus there is a need for a system to determine and apply an appropriate guard time for each received symbol at or near the signals symbol rate.

Therefore, it is an object of the present invention to obviate the deficiencies of the prior art and present a novel system and method for implementing an adaptive receiver that adjusts the amount of guard-time per symbol based on an estimate of the degree of multi-path distortion being experienced on the communications channel.

It is another of object of an embodiment of the present invention to present in a radio frequency receiver for receiving an M-ary symbol signal in a multi-path signal environment, a novel method of adaptively determining the guard time between successive received symbols. Embodiments of the method include predetermining N estimates of possible guard times $G_n$ between 0 and T, receiving a transmitted symbol; and providing the received symbol to M×N parallel processing units $P_{mn}$. The method also includes multiplying the received waveform by a function $F_m$; in each of the plural parallel processing units $P_{mn}$ and integrating the product over a lower limit of integration $G_n$ and an upper limit of integration T in each of the plural parallel processing units $P_{mn}$ to create a M×N outputs. An embodiment of the method also includes generating an estimate of multi-path distortion from the M×N outputs and selecting M parallel processing units $P_{mk}$ based on the estimate of multi-path distortion, where k is a constant.

It is yet another object of an embodiment of the present invention to present in a radio frequency communication system a receiver for receiving an M-ary symbol signal in a multi-path distortion environment. Embodiments of the receiver including two or more sets of processing branches for processing a communication signal wherein each processing branch comprises a multiplier for multiplying the received signal by a function f and an integrator with a lower integration limit of g and an upper integration limit of T for integrating the product to produce an output. Wherein, for embodiments of the receiver, the function f is different for each processing branch within the respective set of processing branches and the lower integration limit g is different for each of the two or more sets of processing branches. Embodiments of the receiver additionally include an estimator connected to the output of each of the processing branches for creating an estimate of the multi-path distortion of the received signal and a selector; for providing the output of one of the sets of processing branches to a decision unit based on the estimate of the multi-path distortion. The decision units in embodiment of the receiver comprise logic circuits for determining the symbol transmitted.

It is still another object of an embodiment of the present invention to present in a radio frequency receiver a novel method of determining the multi-path distortion on a communication channel. An embodiment of the method includes determining the number of possible transmitted symbols and determining several hypothesized degrees of multi-path distortion where for each possible combination of possible transmitted symbols and hypothesized degree of multi-path distortion, the communication signal is integrated over a period defined by the respective hypothesized degree of multi-path distortion and symbol duration. Embodiments of the method include creating an estimate of the actual multi-path distortion from the results of integration and selecting the results of the integration determined by the hypothesized multi-path distortion most closely matching the estimate of multi-path distortion and determining the symbol from the selected integrations.

It is still yet another object of an embodiment of the present invention to present a novel improvement of a radio frequency receiver for receiving an M-ary signal over a multi-path communication channel including (a) a detector for each M possible signal symbols for processing the received signal as a function of each possible transmitted frequency, $F_m$ and a guard time G, and (b) a decision processor for receiving the processed signals to make a symbol decision. The novel improvement includes N−1 additional detectors for each M possible signal symbols, wherein the N−1 additional detectors have different guard times $G_{n-1}$ different from each other and not equal to G. Embodiments of the improvement also include a multi-path estimator for providing an estimate of the multi-path distortion from the processed signals from the M detectors and M×(N−1) additional detectors; and, a metric selector for selecting M processed signals with a guard time g corresponding to the estimate of multi path distortion and providing the selected M processed signals to the decision processor.

These and many other objects and advantages of the present invention will be readily apparent to one skilled in the art to which the invention pertains from a perusal or the claims, the appended drawings, and the following detailed description of the preferred embodiments

DETAILED DESCRIPTION

Figure 1:
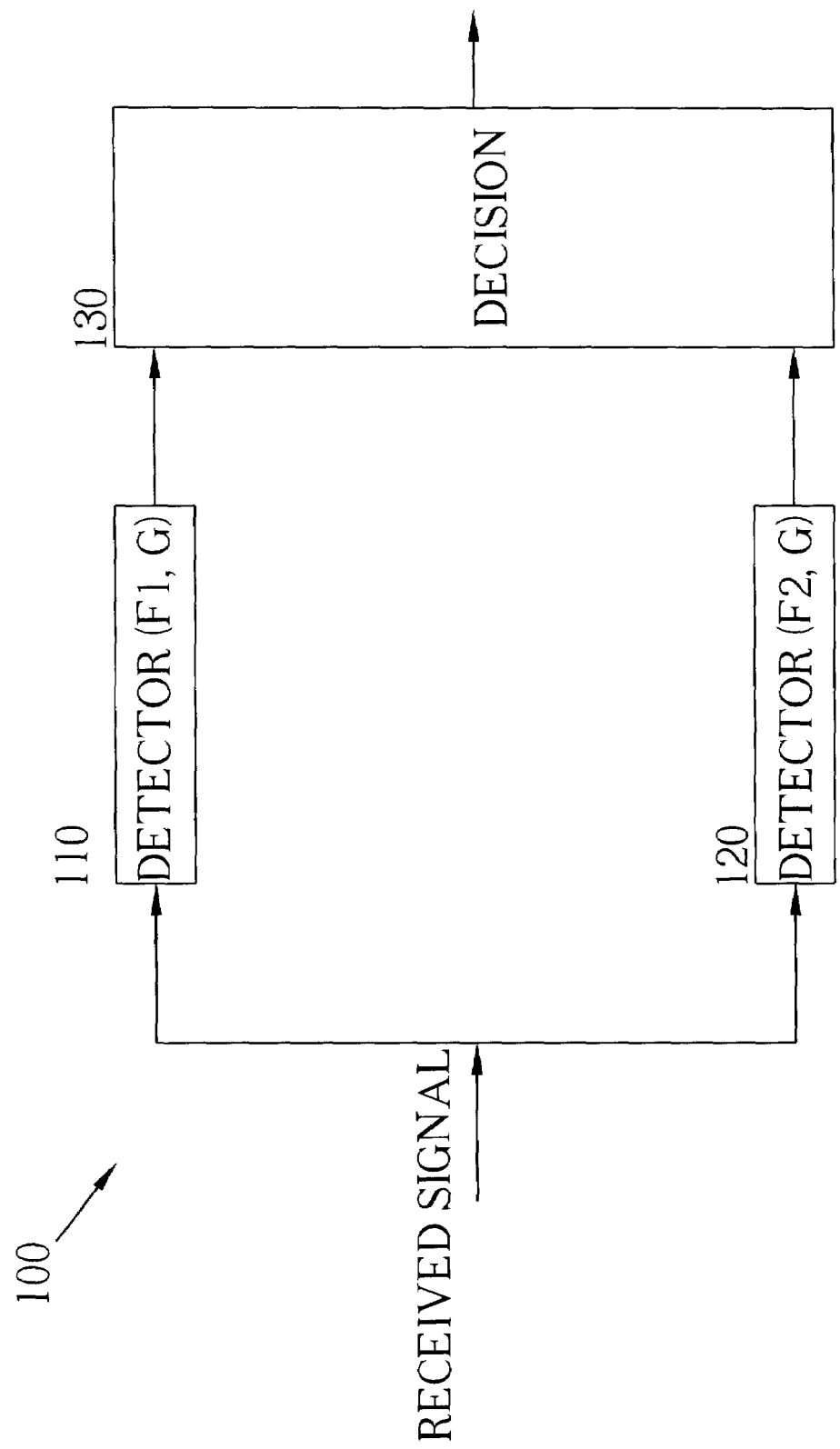
FIG. 1 is a high level representation of a prior art FSK receiver.

FIG. 1 displays a high level diagram of a basic prior art FSK receiver for binary FSK signals. In this system, the received waveform is processed for each of the possible transmitted sinusoids and metrics associated with each possibility are compared to make a data decision. The received waveform is processed in detectors 10 and 120. In the binary system displayed only two sinusoids are possible, these corresponding to a "1" or a "0". Thus in the detector 110, the signal is processed as a function of $F_1$ and guard time G, and in the detector 120 the signal is processed as a function of $F_2$ and G. In FIG. 1, $F_1$ is representative of the sinusoid communicating a "1" whereas $F_2$ represents the sinusoid communicating a "0". The outputs of detectors 110 and 120 are supplied to a decision block 130. The decision block 130 can implement a variety of known decision processes and logic such as Viterbi decoding. While this description utilizes the well known non-coherent receive structure for FSK, embodiments of the invention are equally applicable to the more complicated coherent demodulator which includes a phase tracking function.

Figure 2:
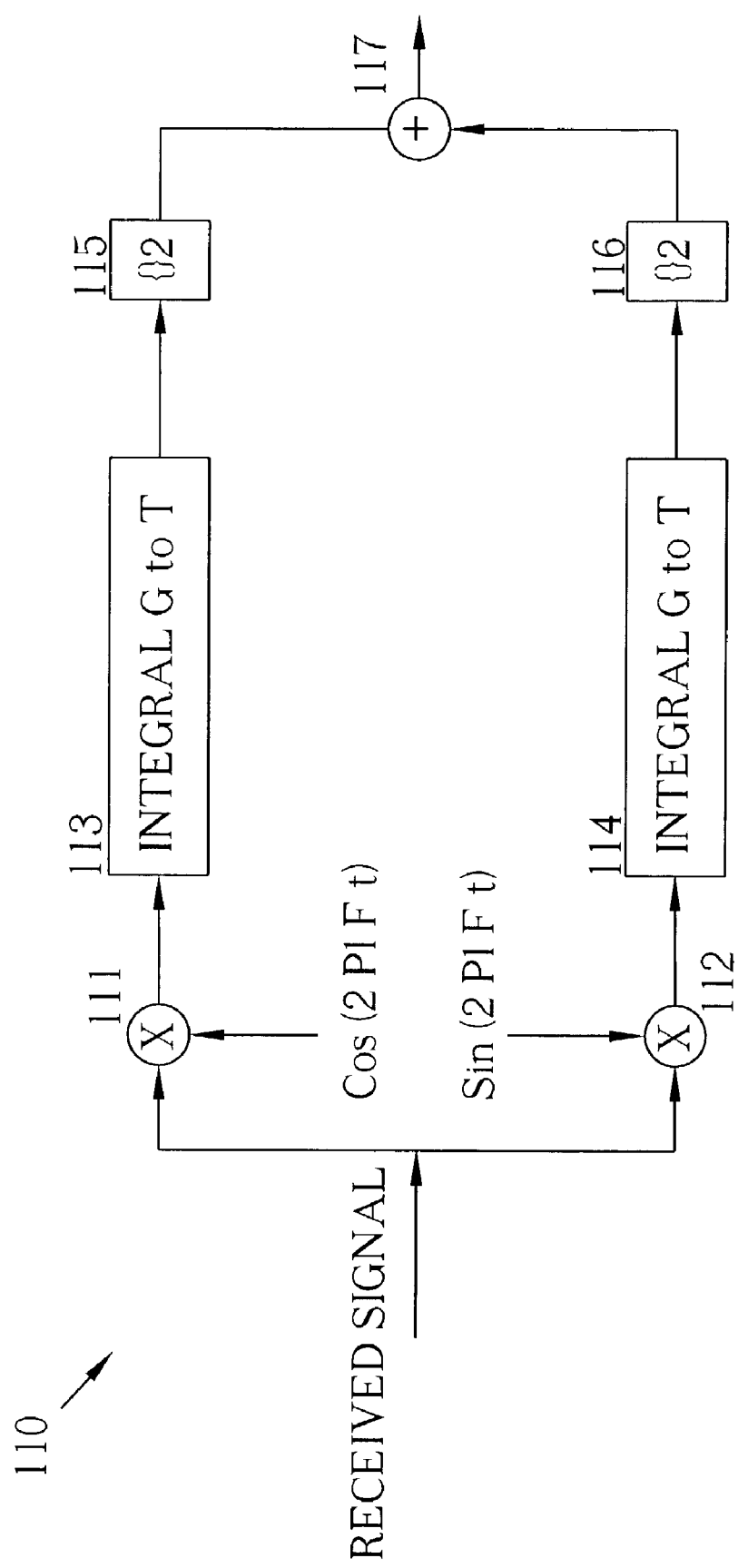
FIG. 2 is a representation of a prior art non-coherent FSK receiver block.

FIG. 2 displays the processing in each prior art non-coherent FSK processing block or detector 110 as shown in FIG. 1. The processing of detector 120 is accomplished in a similar manner. The non-coherent FSK receiver 100 will have one of these blocks (detectors) for each FSK tone or symbol utilized. In FIG. 2, the received waveform is multiplied by both the SIN and COS of the hypothesized transmitted signal (the waveform $F_1$ and $F_2$ representing "0" or "1", or $F_m$ for M-ary signals where m=1–M) by multipliers 112 and 111 respectively. The output of each multiplier is integrated over the duration of the received symbol, from the end of the guard time G until the end of the symbol time T in integrators 113 and 114. The output of the two integrators are squared in blocks 115 and 116 and summed in summer 117 to create a numerical metric or processed signal $P_1$ (or $P_2$ for detector 120) that is used in the decision process.

The integration in FIG. 2 is nominally over the duration of the received symbol, from 0 to T. If the system is designed for operation in a multi-path distortion environment the lower limit of the integration is usually set to the expected level of multi-path distortion, identified as the guard time G, and typically between 2–4 ms. In fixed systems with repeatable multi-path distortion, experimentation can achieve a single optimal guard time, however in mobile systems or those in which multi-path distortions are not steady, a single optimal guard time is not available.

Figure 3:
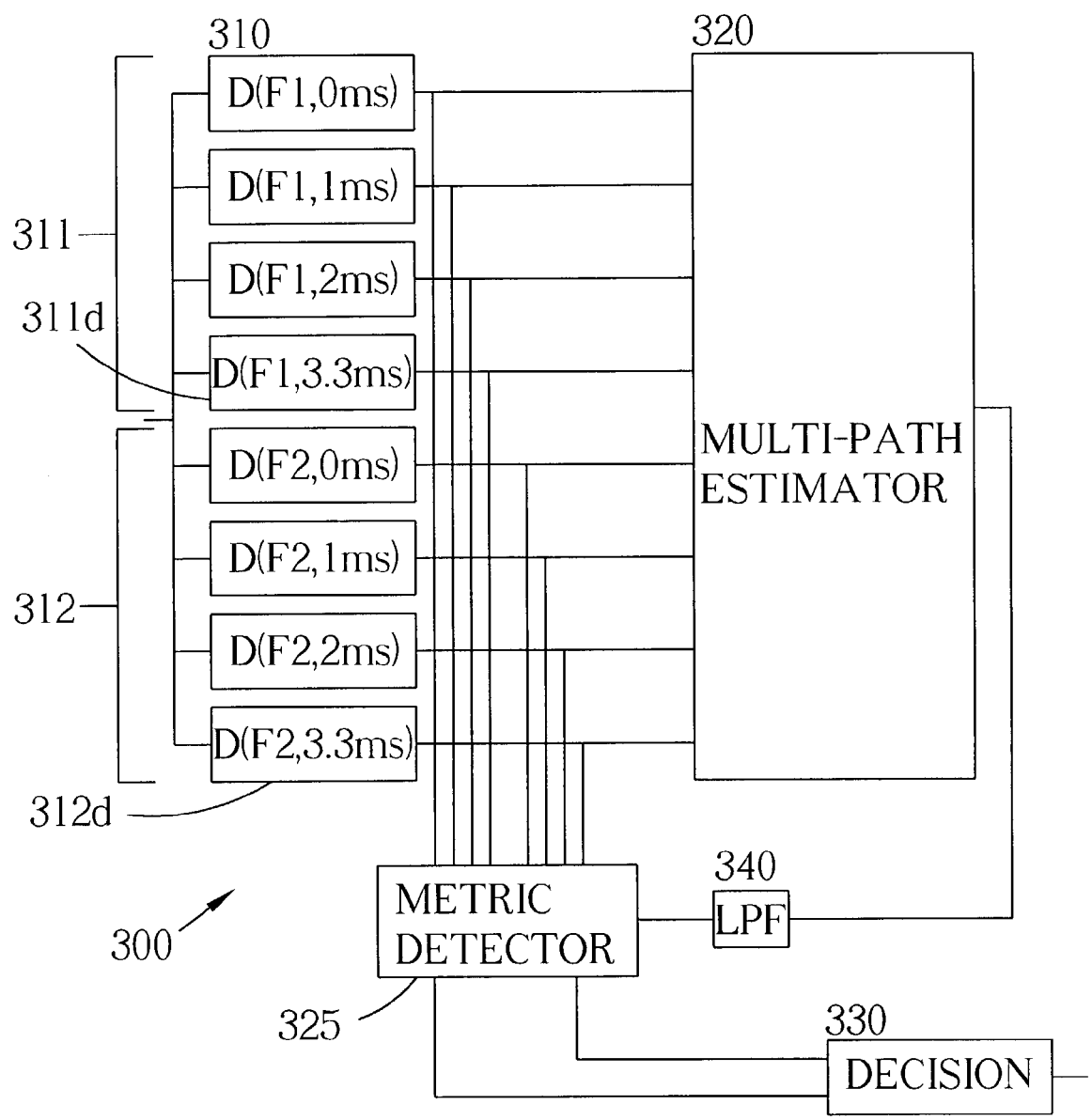
FIG. 3 is a representation of an embodiment of a multi-path adaptive receiver of the present invention.

An embodiment of the present invention is demonstrated in FIG. 3. The embodiment of FIG. 3 implements several hypotheses of different degrees of multi-path distortion (g or $G_n$, where N is the number of different predetermined guard times and n=1 to N) for each possible transmitted frequency ($F_m$, where M is the number of possible symbols and m=1 to M). For example the lower limit of integration may be selected as 0, 1, 2 or 3.3 ms for a typical HF communication system. The number of different hypotheses M×N is not limited by this invention and may be other then those specifically described herein.

The receiver 300 unitizes a plurality of detectors or processing units 310, each processing the received signal as a function of $F_m$ and $G_n$. FIG. 3 is a representation of a Binary FSK signal receiver with four hypotheses of multi-path distortion and two possible transmitted frequencies or symbols. Group 311 are detectors 310 corresponding to the same possible waveform $F_1$ and differing guard time hypotheses $G_n$ and Group 312 corresponds to detectors 310 with the sample possible waveform F2 and differing guard time hypotheses Gn ($G_1$=0, $G_2$=1, $G_3$=2 and $G_4$=3.3). Detectors 311d and 312d form an integrator pair, all possible transmitted symbols $F_1$ and $F_2$ and a single guard time $G_4$=3 ms. Embodiments of the invention will have similarly matched trios, foursomes, etc. according to the number of possible transmitted symbols or frequencies in a given communication system )i.e., a 4-ary symbol signal will have an integrator group of 4 detectors representing all four possible symbols at the same guard time $G_k$).

The output $P_{mn}$ from all of the different hypotheses is applied to a multi-path distortion estimation block 320. Here the values of $P_{mn}$ for each hypothesis are compared, possible distortions due to multi-path distortion are noted, and an estimate of the degree of multi-path distortion, $G_e$, is generated. The estimate of $G_e$ may be updated at a rate at or lower than the symbol rate. This estimate is then utilized in a metric selector 325 to select the correct integrator pair $P_{mk}$(group or set) for the degree of multi-path distortion on the communication channel (where k is the corresponding n satisfying the relationship $G_n \approx G_e$). The estimate $G_e$ from the multi-path distortion estimation block 320 may be advantageously low pass filtered in the low pass filter 340 to track slow variations in multi-path profile, avoiding spurious signals while adapting the guard time during the reception of the signal's symbols. The system and method described enable the signal to be processed with the most appropriate guard time for a changing or steady degree of multi-path distortion on the communication channel.

Figure 4:
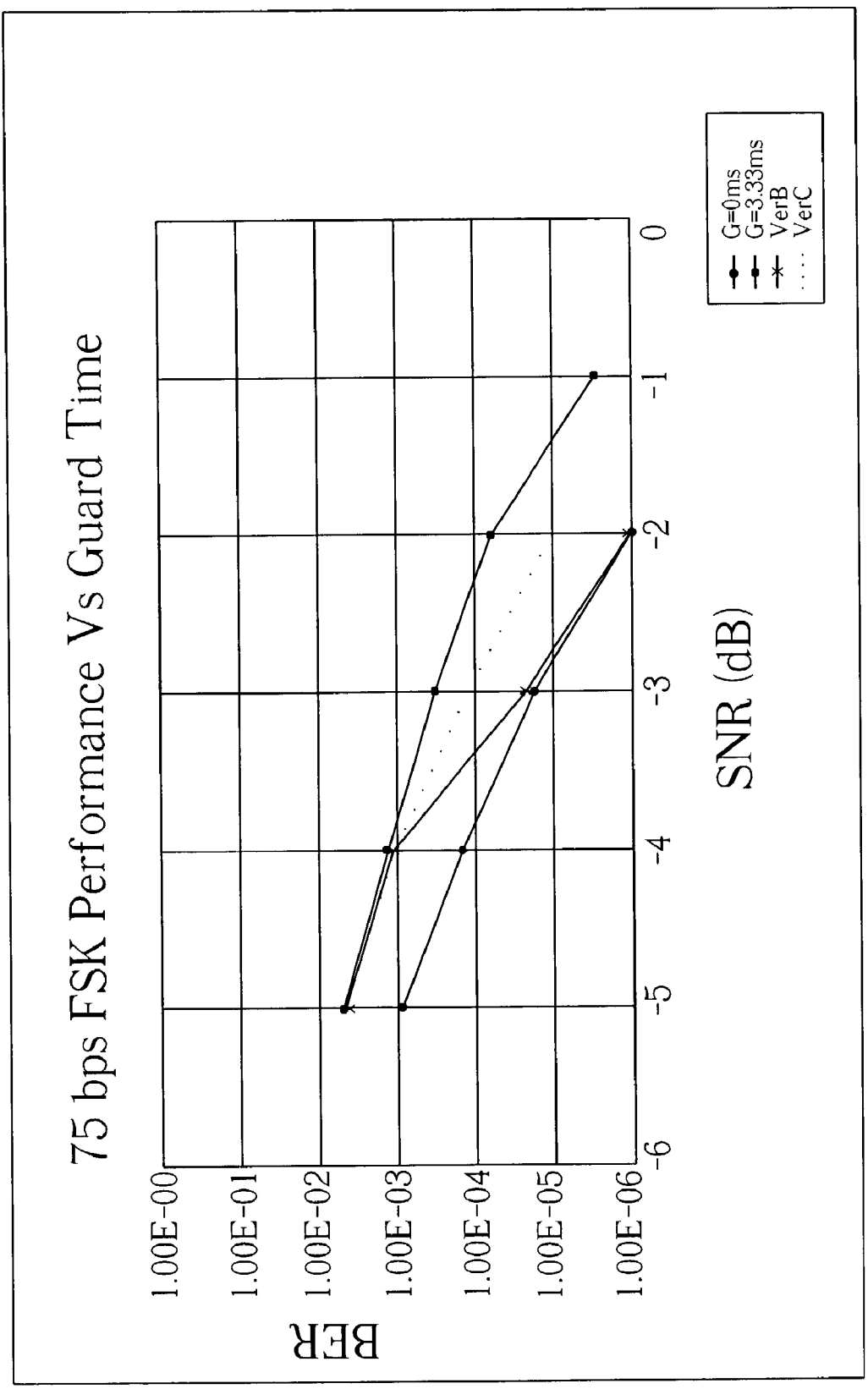
FIG. 4 is a performance graph for an embodiment of the present invention in an Additive White Gaussian Noise Channel.

FIG. 4 displays the simulated performance of an embodiment of the invention for an Additive White Gaussian Noise Channel (AWGN). An embodiment of the invention, identified as VerB, achieves the same performance as a 0 ms guard time implementation at −3 dB SNR and above. The 0 ms guard time is the optimal selection for the AWGN channel which has no multi-path distortion.

Figure 5:
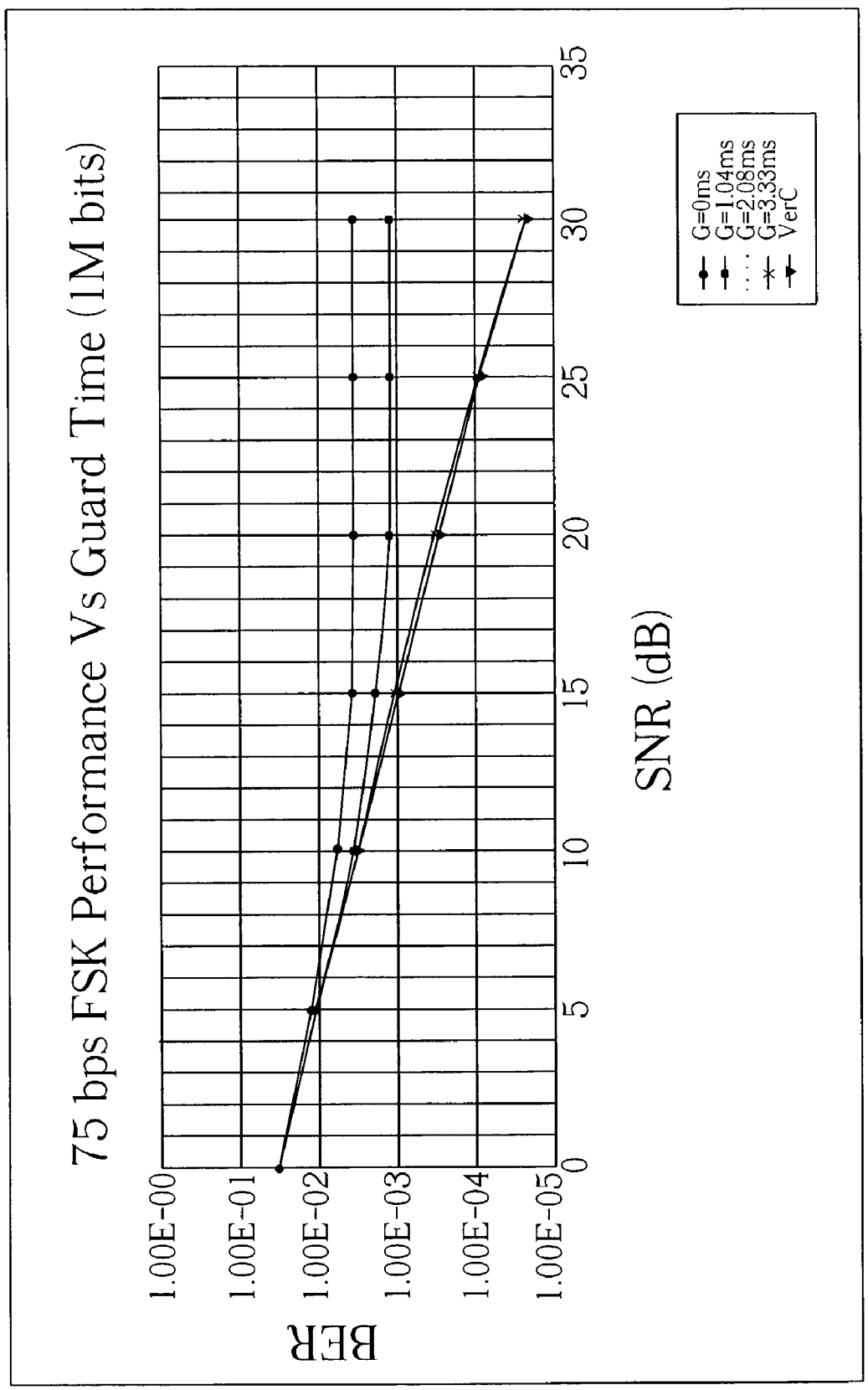
FIG. 5 is a performance graph for an embodiment of the present invention under poor channel conditions.

FIG. 5 is a graph of the performance of the invention under a significant amount of multi-path distortion that is characterized by a multi-path spread of 2 ms. As shown in the graph, an embodiment of the present invention identified as VerC achieves very close to the optimal 2.08 ms guard time performance. The implementation of embodiments of the present invention allow near optimal or optimal performance for a given multi-path environment over a range of multi-path environments.

Although embodiments described herein specifically address the HF radio propagation band, embodiments of the invention are equally applicable to all communication systems that utilize all variation and transmit Orders of FSK, such as Phase Shift Keying (PSK), Quaternary Phase Shift Keying (QPSK), Orthogonal Frequency Division Multiplexing (OFDM) or other modulation schemes in which the symbol duration is significantly greater than the expected multipath delay, and all radio frequency bands which can experience multi-path distortion or fading, including VHF, UHF mobile radio channels, cell phones etc. While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. In a radio frequency receiver for receiving an M-ary symbol signal in a multi-path signal environment, a method of adaptively determining the guard time between successive symbols comprising the steps of:
predetermining N estimates of possible guard times $G_n$, wherein $0 \leq G_n \leq T$, wherein T is the symbol duration and wherein n=1 to N;
receiving a transmitted symbol;
providing the received symbol to M×N parallel processing units defined as $P_{mn}$, where M is the number of possible symbols and wherein m=1 to M;
in each of the plural parallel processing units $P_{mn}$, multiplying the received waveform by a corresponding function $F_m$ to thereby form a product;
integrating the product over a lower limit of integration equal to $G_n$ and an upper limit of integration equal to T in each of the corresponding plural parallel processing units $P_{mn}$ to thereby create M×N outputs;
generating an estimate of multi-path distortion $G_e$ from the M×N outputs; and,
selecting M parallel processing units $P_{mk}$ based on the estimate of multi-path distortion, where k is equal to n, where $G_n \approx G_e$, to thereby adaptively determine the guard time.

2. The method of claim 1, further comprising the step of low pass filtering the estimate of multi-path distortion.

3. The method of claim 1, further comprising the step making a symbol decision based on the output of the M parallel processing units $P_{mk}$.

4. The method of claim 1 wherein the communication signal is a FSK signal.

5. The method of claim 1, wherein M=2 and N=4.

6. The method of claim 1, wherein $0 \leq G_n \leq 4$ ms.

7. The method of claim 1, wherein the estimate of multi-path distortion is updated at or below the symbol rate.

8. In a radio frequency communication system, a receiver for receiving an M-ary symbol signal, with a symbol period of T, in a multi-path signal distortion environment comprising:
two or more sets of processing branches for processing a communication signal, wherein each processing branch comprises a multiplier for multiplying the received signal by a function f to thereby form a product and an integrator with a lower integration limit of g and an upper integration limit of T for integrating the product to produce an output, and wherein the function f is unique for each processing unit within the respective set of processing branches, and wherein the lower integration limit g is unique for each of the two or more sets of processing branches, and wherein the values of g are predetermined;
an estimator operatively connected to the output of each of the processing branches for creating an estimate of the multi-path distortion of the received signal from the outputs;
a selector operatively connected to the estimator and each processing branch for providing the output of one of the sets of processing branches to a decision unit based on the estimate of the multi-path distortion; and,
said decision unit comprising logic circuits for determining the symbol transmitted, thereby enabling the receiver to receive the M-ary symbol signal in a multi-path signal distortion environment.

9. The receiver of claim 8, further comprising a low pass filter for low pass filtering the estimate of multi-path distortion.

10. The receiver of claim 8 wherein the received signal is a FSK signal.

11. The receiver of claim 8, wherein the lower integration limit g is $0 \leq g \leq 4$ ms.

12. A method of determining at a radio frequency receiver the multi-path distortion on a communication channel comprising the steps of:
determining the number of possible transmitted symbols;
determining several hypothesized degrees of multi-path distortion
for each possible unique combination of possible transmitted symbols and hypothesized degrees of multi-path distortion, multiplying a communication signal by a function corresponding to a possible transmitted symbol to form a product and integrating the product over a period defined by one of the several hypothesized degree of multi-path distortion and symbol duration to form a integration; and, creating an estimate of the actual multi-path distortion from the integrations and selecting the integrations corresponding to the hypothesized multi-path distortion most closely matching the estimate of multi-path distortion, thereby determining the degree of multipath distortion.

13. The method of claim 12, further comprising the step of low pass filtering the estimate of actual multi-path distortion.

14. The method of claim 12, further comprising the step making a symbol decision based on the selected results of integration.

15. The method of claim 12, wherein the communication signal is a FSK signal.

16. The method of claim 12, wherein the several hypothesized degrees of multi-path distortion is between or equal to 0 and 4 ms.

17. The method of claim 12, wherein the estimate of actual multi-path distortion is updated at or below the symbol rate.

18. In a radio frequency receiver for receiving a M-ary signal over a multi-path communication channel including a detector for each M possible signal symbols for processing the received signal as a function $F_m$ and a guard time G thereby producing a detector output, and a decision processor receiving output of the detectors to make a symbol decision, the improvement comprising:

for each M possible signal symbols, a set of (N−1) additional detectors having guard times $G_{n-1}$ different from each other in the set and not equal to G, thereby providing M×(N−1) additional detector outputs;

a multi-path estimator for providing an estimate of the multi-path distortion from the M detector outputs and from the additional detector outputs; and, a metric selector for selecting the M detector outputs or M of the additional detector outputs, which correspond to a guard time g that is approximately equal to the estimate of multi path distortion and providing the selected output to the decision processor, thereby enabling reception of the M-ary signal.

19. The receiver of claim 18, further comprising a low pass filter for low pass filtering the estimate of multi-path distortion.

20. The receiver of claim 18 wherein the received signal is a FSK signal.

21. The receiver of claim 18, wherein $0 \leq G_{n-1}$ and $G \leq 4$ ms.

22. The receiver of claim 18, wherein M=2 and N=4.

23. The receiver of claim 18, wherein $N \geq 2$.

* * * * *